United States Patent [19]

Nill et al.

[11] Patent Number: 5,069,733

[45] Date of Patent: Dec. 3, 1991

[54] METHOD OF MANUFACTURING THE LUMINESCENT SCREEN OF A DISPLAY DEVICE

[75] Inventors: Eberhard Nill, Oberesslingen; Kurt M. Tischer, Wendlingen, both of Fed. Rep. of Germany

[73] Assignee: Nokia Unterhaltungselektronik, Pforzheim, Fed. Rep. of Germany

[21] Appl. No.: 374,619

[22] Filed: Jun. 29, 1989

Related U.S. Application Data

[63] Continuation-in-part of Ser. No. 169,403, Mar. 17, 1988, abandoned.

[30] Foreign Application Priority Data

Mar. 20, 1987 [DE] Fed. Rep. of Germany ....... 3709206

[51] Int. Cl.[5] .......................... B44F 1/00; B32B 31/00

[52] U.S. Cl. ....................................... 156/67; 156/235; 156/246; 101/44

[58] Field of Search ............... 156/230, 235, 240, 246, 156/249, 309.9, 540, 67; 101/33, 34, 43, 44, DIG. 35; 118/46, 56, 76, 77, 109

[56] References Cited

U.S. PATENT DOCUMENTS

| | | | |
|---|---|---|---|
| 4,423,676 | 1/1984 | Neel | 118/46 |
| 4,511,425 | 4/1985 | Boyd et al. | 156/542 |
| 4,522,671 | 6/1985 | Grünwald et al. | 156/240 |
| 4,584,039 | 4/1986 | Shea | 156/249 |
| 4,595,400 | 6/1986 | Lynch | 156/249 |

FOREIGN PATENT DOCUMENTS 0104834 4/1984 European Pat. Off. .

*Primary Examiner*—Michael W. Ball
*Assistant Examiner*—Louis Falasco
*Attorney, Agent, or Firm*—Peter C. Van Der Sluys

[57] ABSTRACT

A method of manufacturing luminescent screens (2) for, e.g., color picture tubes is described. It uses a printing apparatus with heated printing blocks (3) and tampons (4). The printing inks (D) consist of a mixture of a hot-melt adhesive and the respective luminescent materials. The printing inks are printed from the printing blocks directly on the inside of the faceplate (1) of the color picture tube. It is also possible to first print a black matrix (M) of a ceramic glass color.

13 Claims, 1 Drawing Sheet

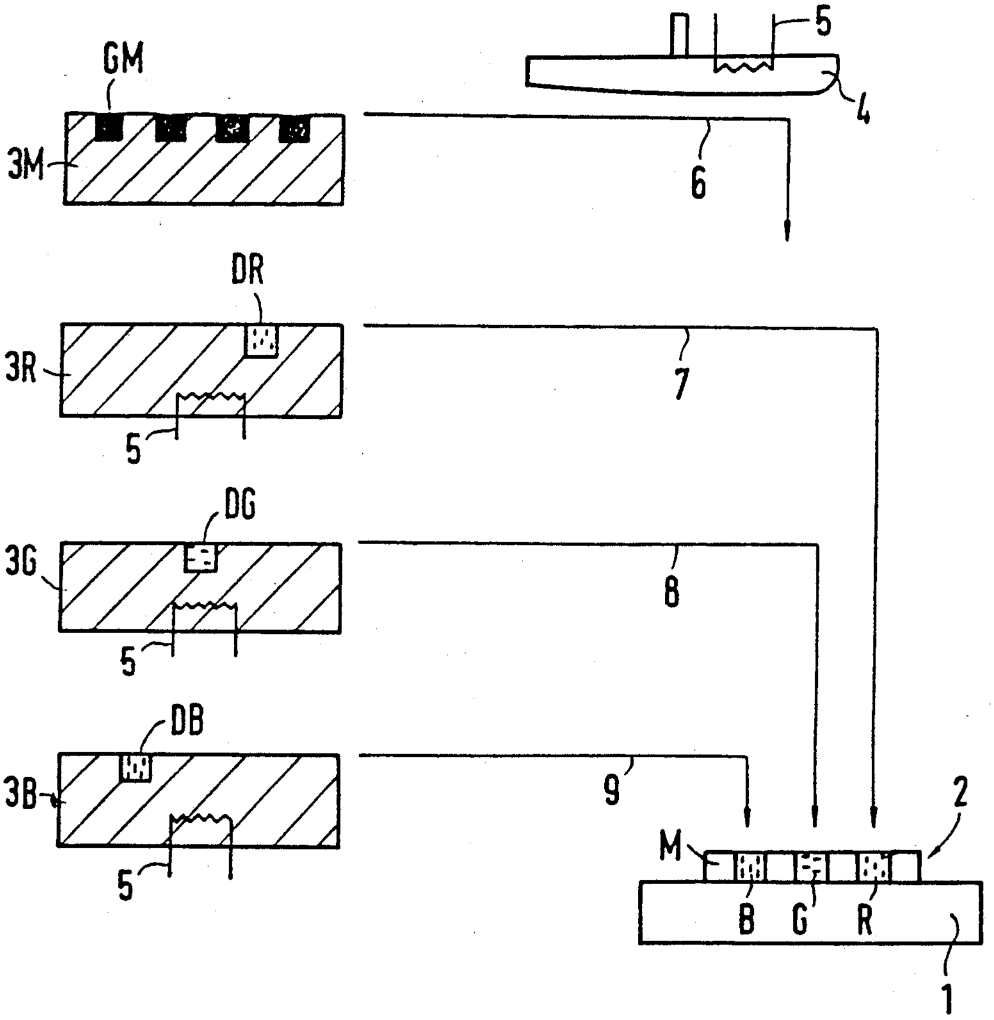
GM
3M
5
4
6
DR
3R
7
5
DG
3G
8
5
DB
3B
9
5
2
M
B
G
R
1

METHOD OF MANUFACTURING THE LUMINESCENT SCREEN OF A DISPLAY DEVICE

This is a continuation-in-part of co-pending application Ser. No. 169,403 filed on Mar. 17, 1988 now abandoned.

DESCRIPTION

The present invention pertains to a method of manufacturing the luminescent screen on the inside of a faceplate of a color display device using a printing apparatus and printing inks consisting of a mixture of hot-melt adhesive and luminescent materials, the printing apparatus comprising printing blocks which are heated, and a tampon for transferring the printing ink directly from the printing blocks to the inside of the faceplate.

EP-A1-0 104 834 discloses a color picture tube in which a black matrix and the color phosphors of the luminescent screen are applied to the front panel by a printing process. Mixtures of a hot-melt adhesive and either graphite for the black matrix or color phosphors are used as printing inks. From a heated trough, in which they are contained in the liquid state, they are transferred to gravure rolls, which are also heated. By means of transfer rolls, the patterns in the gravure rolls are applied to a flexible membrane. First, the printing ink with the black graphite is applied to the membrane, then, the printing inks with the color phosphors are applied in succession. The membrane, held by a frame, is then positioned in the faceplate of the color picture tube. A flexible plunger urges the flexible membrane against the faceplate. The black matrix and the color phosphors then adhere to the faceplate, and the plunger and, thus, the membrane can be removed. The faceplate is then treated in the usual manner by depositing first a sealant and then an aluminum coating on the screen and subsequently burning the organic constituents off.

Although this method of manufacturing a luminescent screen makes it possible to print the screen onto the inside surface of the faceplate in one step, it requires costly and complicated apparatus with many moving parts.

It is the object of the invention to provide a simpler method of manufacturing a luminescent screen.

This object is achieved by a method of manufacturing the luminescent screen using a printing apparatus and printing inks consisting of a mixture of hot-melt adhesive and luminescent materials, the printing apparatus comprising printing blocks which are heated and a tampon wherein the tampon is used to directly transfer a pattern of the printing ink from the printing block onto the inside of a faceplate. Further advantageous features of the invention are that for each printing block one separate tampon is used and the tampon may be heated. The printing inks contain about 80 percent luminescent material and have a melting point of about 60°-80 degrees C. Prior to printing of the printing inks containing the luminescent materials a black matrix of a ceramic glass color may be printed from a printing block directly onto the faceplate by means of a tampon, after which the ceramic glass color is fired. The tampons may be of several different forms, including a hemispherical shape or a cylindrical shape which may roll over the printing blocks and the faceplate. The tampons have a Shore hardness in the range of 2-20. The patterns formed in the printing blocks may be distorted in such a manner that their images on the faceplate are so shaped and oriented that the finished display device displays a picture free from undesired colors. The printing block and faceplate may be mounted on a temperature-compensated unit.

The method according to the invention allows rapid manufacture of luminescent screens for color display devices. Distortions occurring during the printing step and other errors can be compensated for by predistorting the patterns in the printing blocks used. The printing apparatus needed to carry out the method according to the present invention is simpler than the known printing devices.

The invention will be better understood from a reading of the following detailed description in conjunction with the single FIGURE.

By this method, conventional faceplates of color picture tubes can be provided with luminescent screens. The latter can consist of phosphor dots or phosphor stripes. It is also possible to manufacture luminescent screens with a black matrix. The method is also suitable for manufacturing luminescent screens of novel flat-panel display devices. Furthermore, the method can be used irrespective of whether the display device has a shadow mask or not.

In the following, the method will be described as applied to a color display device with a flat faceplate 1 and a luminescent screen 2 consisting of a black matrix M and the usual three phosphors red R, green G, and blue B.

The FIGURE shows only four printing blocks 3M, 3R, 3B, 3G in a sectional view, and a transfer device 4 in the form of a hemispherical tampon. The printing blocks 3R, 3G, and 3B are heated, which is indicated by a heater winding 5 in each of the printing blocks.

The pattern in the printing block 3M is filled in the usual manner with a black ceramic glass color GM which is taken up by the transfer device 4 and printed onto the faceplate 1 (arrow 6). The glass color is then fired, thus fusing with the glass of the faceplate and forming the black matrix M, which can no longer be removed. As a ceramic glass color, the glass color No. 392016/64/5211, which is commercially available from Blythe Colors, Maastricht, Holland, can be used. The printing inks DR, DG, and DB are printed successively into the spaces between the black matrix M in accordance with the patterns in the printing blocks 3R, 3G, and 3B, respectively. The printing inks consist of a mixture of a hot-melt adhesive which is liquid at 60°-80° C. and evaporates residue-free at over 300°, and the phosphors red, green and blue, respectively. The hot-melt adhesive belongs to the acrylate group; in particular, compounds of copolymeric acrylate styrenes can be used. Such a hot-melt adhesive is commercially available from Blythe Colors, Maastricht, Holland. The phosphor content is about 80%.

The patterns in the printing blocks 3R, 3G, and 3B are filled in the usual manner with the heated and, thus, liquid printing inks DR, DG, and DB, respectively. Since the printing blocks are heated, the printing inks remain liquid and can be taken up successively by the transfer device 4 and printed directly onto the faceplate 1, which is kept at room temperature. This process is performed successively for each printing ink and is indicated by the arrows 7, 8, and 9.

If necessary, the transfer device 4 may be heated, too, which is accomplished through the heater winding 5. Also, two transfer devices may be used, one for printing the black matrix, and the other for printing the phosphors. It is also possible to associate one transfer device with each printing block. The Shore hardness of the surface of the transfer device(s) should be in the range from 2 to 20. For flat faceplates, cylinder-shaped tampons which roll over the printing blocks and the faceplate may be used instead of hemispherical tampons. Preferably the printing blocks and faceplates are mounted so that their surfaces lie in a single plane so that the cylindrical tampon need only have one reciprocating movement as it is rolled first over a printing block surface and then over the faceplate surface. The faceplate may then be moved step-by-step along a plurality of printing blocks to sequentially print the patterns. By using flat surfaces it is then possible to mount the printing blocks and the faceplate on a temperature-compensated unit in order to compensate for length variations resulting from temperature differences. Such a unit can be used particularly for printing the black matrix M.

After the black matrix and the phosphor pattern have been formed, the usual lacquer and aluminum coatings are applied to the luminescent screen. Next, the organic materials of the luminescent screen are burned off and the faceplate with the luminescent screen is ready for mounting in the display device.

In the printing process, distortions occur which result in variations from the equidistant pattern of the luminescent screen. To compensate for these errors, the patterns in the printing blocks are distorted in such a manner that the finished display panel displays a picture which is free from undesired colors. This can be attained by manufacturing a luminescent screen with uncorrected printing blocks and by mounting it in a display device. During operation of this display device with a uniform pattern, the direction and magnitude of the beam-landing errors are measured. Printing blocks are then manufactured in which the patterns are distorted in accordance with the measured magnitude and in a direction opposite to the measured direction. The luminescent screens thus manufactured will then display a picture which is free from undesired colors.

A major advantage of using flat faceplates and printing blocks is that the patterns in the printing blocks are almost identical to those printed on the screen. Due to the similarity of the patterns it is very easy to change the printing block pattern to compensate for distortions that occur due to temperature differences between the printing blocks and the faceplate.

We claim:

1. A method of forming a luminescent screen having a predetermined pattern on the inside surface of a flat faceplate of a color display device, said method comprising the steps of:

providing a plurality of printing blocks each having a flat surface with wells formed therein in a pattern, the patterns of each printing block being combinable to form a composite pattern corresponding to the predetermined pattern;

filling said wells with printing ink formed of a mixture of hot-melt adhesive and a luminescent material;

heating said printing blocks so that the printing ink becomes liquid;

providing at least one cylindrical transfer device; and sequentially printing the pattern of each printing block onto the flat surface of the faceplate by rolling the cylindrical transfer device over a flat surface of the printing block to take up printing ink from said wells, and thereafter rolling the cylindrical transfer device over the inside of said flat faceplate to deposit printing ink on said flat faceplate and repeating said rolling steps for each printing block, whereby the printing ink from each rolling step remains on the inside of the faceplate and forms said predetermined pattern.

2. A method as described in claim 1, additionally comprising the step of providing a separate cylindrical transfer device for each printing block for sequentially printing each of the patterns from the printing blocks to the inside of said faceplate.

3. A method as described in claim 1, additionally comprising the step of heating said cylindrical transfer device.

4. A method as described in claim 1, additionally comprising the step of heating the printing blocks to a temperature higher than the temperature of the faceplate.

5. A method as described in claim 4, additionally comprising the step of maintaining a constant temperature difference between the heated printing blocks and the faceplate, so that printing distortions remain constant.

6. A method as described in claim 5, additionally comprising the step of mounting the printing blocks and faceplate on a temperature-compensated unit for maintaining the constant temperature difference.

7. A method as described in claim 1, additionally comprising the step of orienting the printing blocks and faceplate such that the flat surfaces of the printing blocks and the inside surface of the flat faceplate lie in a single plane, and the cylindrical transfer device is fist rolled over the printing block and then over the faceplate.

8. A method as described in claim 7, wherein the cylindrical transfer device is moved across the surfaces in a reciprocating movement.

9. A method as described in claim 1, wherein prior to printing the patterns of the printing blocks containing the luminescent material, performing the steps of:

providing a printing block having a flat surface with wells formed therein in a pattern for a black matrix to be used on the inside surface of the flat faceplate;

filling the wells of the printing block with a black ceramic glass;

heating said printing block so that the black ceramic glass becomes liquid;

printing the pattern of said black matrix onto the flat surface of the faceplate by rolling the cylindrical transfer device over the flat surface of the printing block to take up said black ceramic glass from said wells, thereafter rolling the cylindrical transfer device over the inside of said flat faceplate to deposit said black ceramic glass on said flat faceplate; and firing said black ceramic glass to fuse the black ceramic glass with the glass faceplate, thereby forming the black matrix.

10. A method as described in claim 2, additionally comprising the step of orienting the printing blocks and faceplate such that the flat surfaces of the printing blocks and the inside surface of the flat faceplate lie in a single plane, and the cylindrical transfer device is fist rolled over the printing block and then over the faceplate.

11. A method as described in claim 10, wherein the cylindrical transfer device is moved across the surfaces in a reciprocating movement.

12. A method as described in claim 11, wherein the faceplate is moved step-by-step along said plurality of printing blocks.

13. A method of forming a luminescent screen having a predetermined pattern on the inside surface on a flat faceplate of a color display device, said method comprising a printing process including the steps of:

providing a plurality of printing blocks each having a flat surface with wells formed therein in a pattern, the patterns of each printing block being combinable to form a composite pattern corresponding to the predetermined pattern, the size and spacing of the wells in each printing block being distorted to compensate for distortions which occur during the printing process, so that the patterns formed by the wells are distorted images of the predetermined pattern, said distortion being such that the composite pattern printed on the faceplate is shaped and oriented such that the finished display device displays a picture free from undesired colors;

filling said wells with printing ink formed of a mixture of hot-melted adhesive and a luminescent material;

heating said printing blocks so that the printing ink becomes liquid;

providing at least one cylindrical transfer device; and sequentially printing the pattern of each printing block onto the flat surface of the faceplate by rolling the cylindrical transfer device over a flat surface of the printing block to take up printing ink from said wells, and thereafter rolling the cylindrical transfer device over the inside of said flat faceplate to deposit ink on said flat faceplate and repeating said rolling steps for each printing block, whereby the printing ink from each rolling step remains on the inside of the faceplate and forms said predetermined pattern.

* * * * *